United States Patent

Webb

[11] 3,821,612

[45] June 28, 1974

[54] FAST RESPONSE SOLEINOID

[75] Inventor: George L. Webb, Fond Du Lac, Wis.

[73] Assignee: Deltrol Corp., Bellwood, Ill.

[22] Filed: Apr. 2, 1973

[21] Appl. No.: 347,356

[52] U.S. Cl.............................. 317/151, 317/155.5
[51] Int. Cl. ...................................... H01h 47/00
[58] Field of Search.................. 317/151, 155, 155.5

[56] References Cited
UNITED STATES PATENTS
3,361,939    1/1968    Smith.............................. 317/155.5

*Primary Examiner*—L. T. Hix
*Attorney, Agent, or Firm*—John L. Harris

[57] ABSTRACT

A fast operate-fast release direct current solenoid includes a main winding and an auxiliary winding having equal turns. The windings are connected in parallel to a control switch. A capacitor is connected in series with the auxiliary winding only and a diode is interposed between the control switch and both windings. When the control switch is closed, both windings are energized, causing fast pull in. The capacitor then charges and stops current to the auxiliary winding. When the control switch opens, the capacitor discharges through both coils.

4 Claims, 2 Drawing Figures

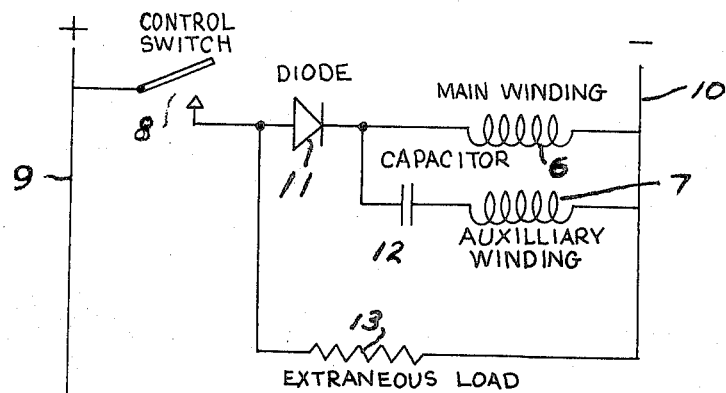
Fig. 1
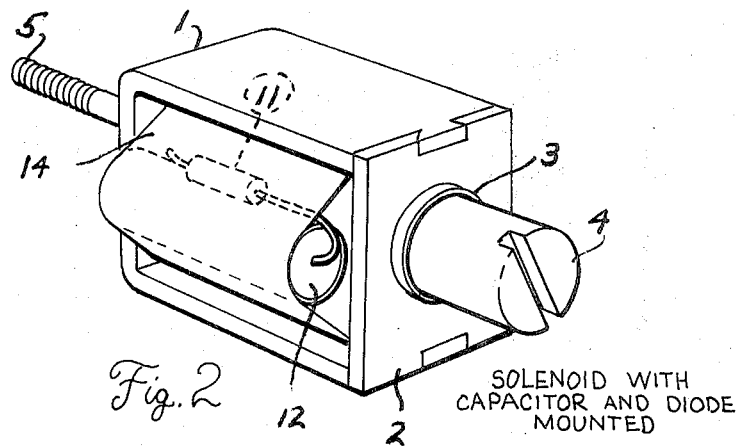
Fig. 2  SOLENOID WITH CAPACITOR AND DIODE MOUNTED

FAST RESPONSE SOLENOID

BACKGROUND OF INVENTION

This invention relates in general to electro-magnetic devices and more particularly to solenoids of the direct current type. These devices have the characteristic of requiring more power to pull in than the hold in. When initially energized the gap at the plunger is at a maximum and the pull on the plunger is at a minimum. As the plunger moves in to its seat, the air gap decreases and the pull increases, making it possible to reduce the power applied when the plunger is seated.

In applications requiring fast action or high pull in power, it is common to provide the solenoid with two coils and a switch in series with one coil which is opened as the plunger seats. This arrangement requires the switch, a mounting for the switch, and operating means for the switch. This is costly and also subject to malfunctioning.

BRIEF SUMMARY OF INVENTION

The primary object of the invention is to provide a solenoid or electro-magnet that is both fast operating and fast releasing.

This is achieved by the use of two windings with a capacitor in series with one. The two windings are complementary. When power is applied, both windings create a mmf. for fast pull in of the plunger. When the capacitor fully charges, current to its winding stops, this reducing the power applied.

A further object of the invention is to provide a control system for an electro-magnet in which the power applied thereto after pull-in is reduced by charging of a capacitor.

Another object of the invention is the use of the capacitor discharge for instantly reducing the mmf. to zero when power is removed from the system. This is accomplished by making the windings of equal turns and arranging the capacitor to discharge reversely through the two windings. The mmf. if one winding cancels that of the other, and the combined mmf. becomes zero while the capacitor is discharging.

A further object is to prevent an extraneous load from affecting the equality of the capacitor discharges through both windings. This is accomplished by the provision of a diode between the control system and the extraneous load.

Other objects of the invention will become apparent from the following detailed description and appended claims.

BRIEF DESCRIPTION OF DRAWINGS

FIG. 1 is a schematic wiring diagram of the control system for the double winding solenoid.

FIG. 2 is a perspective view of a solenoid showing the mounting arrangement for the capacitor and diode.

DETAILED DESCRIPTION OF INVENTION

The solenoid to which the invention is applied is of usual construction including a C-frame 1, a front plate 2, a bobbin 3, and a plunger 4 which extends through the core of the bobbin. The solenoid shown is of the "push" type and the plunger 4 includes an extension 5 which extends through the back of frame 1 and the usual backstop (not shown). The bobbin which is of usual construction carries a main winding 6 (FIG. 1) and an auxiliary winding 7 which is wound over the main winding in the same direction and has the same number of turns.

As shown in FIG. 1, a control switch 8 is attached to the positive line 9 of a direct current power source including a negative line 10. The other side of switch 8 is connected to a diode 11, which is in turn connected to the main winding 6 and auxiliary winding 7 which are in parallel relationship and attached to negative line 10. A capacitor 12 is interposed between the diode 11 and the auxiliary winding 7. The control switch 8 in addition to controlling power to the solenoid also may control the power to an additional or extraneous load 13.

As shown in FIG. 2, the diode 11 and capacitor 12 may be located under a wrapper 14 which surrounds the coils 6 and 7 within the solenoid frame.

When the control switch 8 is closed, current from positive line passes through diode 11 and main winding 6 to negative line 10. Also as the capacitor 12 is now discharged, current flows through the capacitor and auxiliary winding 7, to line 10. As both windings are wound in the same direction and as the current flow is in the same direction, the mmf. produced by each winding are additive, and the combined flux pulls the solenoid plunger 4 in a direction closing the open magnetic path in the solenoid. If the extraneous load 13 is in the system, current also flows through this load.

The capacitor 6 starts charging immediately when the solenoid pulls in which reduces the voltage applied to the auxiliary winding 7. When the capacitor is fully charged, the current flow through the auxiliary winding is stopped, and the solenoid is held in solely by the current flow through the main winding.

From the foregoing it will be apparent that when the control switch closes, the auxiliary winding acts as a booster for the main winding and the combined flux causes the plunger to pull in faster than would occur if only the main winding was working.

After the plunger pulls in, the capacitor stops current flow through the auxiliary winding which reduces the heat generated and allows the solenoid to run cool.

When the control switch 8 opens, the charged capacitor is free to discharge through the main winding and auxiliary winding. This discharge current flows from the capacitor forward through the main winding then backward through the auxiliary winding to the other side of the capacitor. As the turns are equal and the same current flows through both windings, the mmf. produced by one winding exactly cancels the other for the full discharge of the capacitor. The mmf. affecting the plunger thus instantly drops to zero when the control switch opens and the plunger drops out instantly.

It should be noted that when potential is applied to both windings, the capacitor 12 becomes charged by the current flowing from line 9 through switch 8 and the auxiliary winding 7 to line 10. These elements thus cooperate to form a means for charging the capacitor when potential is applied to the windings. It should also be noted that when potential is removed from the windings, the series circuit from the capacitor through the main winding and reversely through the auxiliary winding back to the capacitor serves as a means for discharging the capacitor through the windings. This series circuit is arranged to cause the mmf. produced in each winding to cancel the other while the capacitor is discharging.

One function of the diode is to prevent the main winding from discharging through the extraneous load when the control switch opens. This insures that the main winding fully cancels the auxiliary winding for obtaining fast release.

The diode provides another advantage in that it permits the capacitor to be of the polarized type which is smaller and less costly. If a polarized capacitor were used without the protection of the diode, reverse polarity accidentally applied could damage the capacitor.

A further advantage of the double coil, diode and capacitor combination is the reduction of inductive voltage when the control switch opens, which reduces arcing across the switch. In the case of non mechanical control devices, the combination reduces voltage spikes.

While many combinations are usable, a specific example of one workable combination consists of a main winding of 1,650 turns no. 29 wire, (27.8 ohms) an auxiliary winding of 1,650 turns no. 30 wire (50 ohms), a capacitor of 220 microfarad 25V. DC, and a diode having a 1 amp. 100 peak inverse voltage rating.

While a preferred form of the invention has been shown and described in detail, changes may be made without departing from the spirit and scope of the invention as set forth in the following claims.

I claim:

1. Control means for an electro-magnetic device including a frame of magnetic material providing an open magnetic path and a movable magnetic member located in said path, the combination of, first and second windings on said frame having substantially the same number of turns, means for applying potential to said windings in a manner combining the mmf. produced by each winding for causing movement of said movable magnetic member to close said path, a capacitor, means for charging said capacitor when potential is applied to said windings, and means for discharging said capacitor through said windings when said potential is removed from the windings, said last named means being arranged to cause the mmf. produced by each winding to cancel the other while said capacitor is discharging.

2. Control means for an electro-magnetic device including a frame of magnetic material and a movable magnetic member movably located in said path, the combination of, a main winding associated with said frame providing a magnetic pull on said movable magnetic member, an auxiliary winding associated with said frame, a first connection for one side of a direct current source, a second connection for the other side of the direct current source, means connecting said coils to said connections in a manner causing the mmf. produced by the coils to be additive when potential is applied to said connections, a capacitor connected in series with the auxiliary winding and serving to reduce the current flow through the auxiliary winding as the capacitor becomes charged following application of potential to said connections, and series circuit means for discharging the capacitor through said windings in series when potential is removed from said connections, said series circuit means being arranged to cause the capacitor discharge current flowing through one winding to cancel mmf. produced by the same discharge current flowing through the other winding.

3. The combination recited in claim 2 in which the coils have substantially the same number of turns so that the discharge current of the capacitor substantially cancels all mmf. when potential is removed from the connections.

4. The combination recited in claim 2 including a diode, said diode having one side connected to one of said direct current source connections and its other side connected to the main winding and capacitor in parallel.

* * * * *